United States Patent Office 3,531,475
Patented Sept. 29, 1970

3,531,475
PROCESS FOR THE OXIDATION OF ALCOHOLS AND OXIDIZING AGENT UTILIZED THEREIN
Marcel Fetizon, Leflageolet, and Michael Golfier, Paris, France, assignors to Société de Recherches Biologiques d'Asnieres, a limited-liability company, Levallois, France
No Drawing. Filed Aug. 13, 1968, Ser. No. 752,184
Claims priority, application France, Aug. 21, 1967, 118,383
Int. Cl. C07c *169/08, 169/10*
U.S. Cl. 260—239.55       18 Claims

ABSTRACT OF THE DISCLOSURE

A process for oxidizing primary and secondary alcohols to aldehydes and ketones in neutral media and in excellent yields comprises reacting a primary or secondary alcohol with an oxidizing agent comprising silver carbonate on an inert carrier, a preferred carrier being diatomaceous earth, particularly Celite. This process is extremely useful when applied to steroidal alcohols, particularly in the oxidation of saturated-A-ring-3-hydroxy steroids to saturated-A-ring-3-keto-steroids.

FIELD OF INVENTION

This invention relates to a process for oxidizing primary and secondary alcohols in a neutral medium and to the oxidizing agent utilized therein.

More particularly, this invention relates to the process of oxidizing primary and secondary steroidal alcohols in a neutral medium by the action of an oxidizing agent comprising silver carbonate and a diatomaceous earth (preferably Celite) whereby is obtained the corresponding aldehyde or ketone, respectively, in excellent yield. Also included in this invention are compositions of matter comprising silver carbonate on a diatomaceous earth (preferably Celite) useful as oxidizing agents in neutral media.

DESCRIPTION OF THE PRIOR ART

Heretofore, compositions of matter comprising silver carbonate on a diatomaceous earth useful as oxidizing agents have been unknown. Also, the process of this invention has been heretofore unknown.

Prior art processes for oxidizing steroidal primary and secondary alcohols to steroidal aldehydes and ketones all require the use of either a basic medium (e.g. the Oppenauer oxidation utilizing aluminum isopropoxide and cyclohexanone in toluene) or an acid medium (e.g. chromic acid in sulfuric acid) or the presence of an activated hydroxy group, e.g. the oxidation of an allylic hydroxyl group such as in a $\Delta^4$-3-hydroxyl moiety by the use of manganese dioxide, which process requires long reaction times. On the other hand, the process of the present invention whereby a steroidal primary or secondary hydroxyl function is oxidized to a steroidal non-carboxy carbonyl derivative by reaction with silver carbonate on a diatomaceous earth advantageously is carried out in a neutral media and, thus, is useful when oxidizing steroidal compounds containing groups sensitive to acid or base. Additionally, the process of this invention will quickly oxidize in good yields non-activated steroidal hydroxyl groups such as those present in a 3-hydroxy-saturated-A-steroidal system such as in 3$\beta$-hydroxy-16$\beta$-methyl-5$\alpha$-pregnane-17$\alpha$,21-diol-20-one 21-acetate, a known intermediate in the preparation of betamethasone (i.e 9$\alpha$-fluoro-16$\beta$-methyl-1,4-pregnadiene-11$\beta$,17$\alpha$,21 - triol-3,20-dione).

SUMMARY OF INVENTION

The invention sought to be patented in its process aspect resides in the concept of an oxidation process in which an alcohol, preferably a steroidal alcohol, having a hydroxyl function selected from the group consisting of a primary and a secondary hydroxyl, is oxidized to a non-carboxy carbonyl steroidal compound in an organic solvent utilizing an oxidizing agent comprising silver carbonate and a diatomaceous earth (preferably Celite).

The invention sought to be patented in its composition of matter aspect resides in the concept of an oxidizing agent comprising silver carbonate and a diatomaceous earth (preferably Celite) which is useful as an oxidizing agent in the oxidation of primary and secondary alcohols to aldehydes and ketones. The composition of matter sought to be patented is particularly useful in oxidizing non-activated steroidal hydroxy functions in a neutral medium, which function heretofore could only be oxidized in acidic or basic media.

GENERAL DESCRIPTION OF THE INVENTION

*The process aspect*

According to one of its aspects, this invention provides a process for oxidizing steroidal hydroxy compounds in the liquid phase which involves using as the oxidizing agent a composition of matter which comprises silver carbonate and an inert carrier on which the salt is dispersed, specifically a diatomaceous earth, with Celite being preferred.

To facilitate complete oxidation of the steroidal hydroxy starting compound, it is preferred that the composition should provide between 2 and 30, advantageously between 8 and 15 molar equivalents of silver carbonate therein per mole of the starting steroidal alcohol.

The process of this invention is conveniently effected in an organic solvent which preferably is substantially anhydrous, since water even in quite small quantities, for example, 1%, can deleteriously affect the reaction leading to poor yields. The solvent should be one which is inert in the sense that it does not adversely affect the oxidizing agent nor the starting compound nor the oxidized product. The solvent of choice often depends upon the nature of the steroidal hydroxy starting compound, though other factors such as price, ease of recovery, temperature conditions, also influence this. Particularly useful as solvents in our process are aromatic hydrocarbons such as benzene, toluene and xylene. In many instances, benzene is the preferred solvent because (a) it is readily available at a reasonable cost; (b) it has a high solubility power for a great number of organic hydroxy compounds including steroidal hydroxy compounds; (c) under standard, atmospheric conditions it has a convenient boiling point (80° C.); and also (d) it can be readily stripped from the reaction mixture upon completion of the reaction. Other suitable solvents include, for instance, chlorinated hydrocarbons such as chloroform, aliphatic alcohols and preferably methanol which is found particularly satisfactory in the oxidation of allylic alcohols and ketones such as methyl, ethyl, ketone and tetrahydrofuran.

The temperature at which the oxidation process is carried out can vary over a wide range. The selection of an appropriate temperature for a particular case will depend upon such factors as the nature of the steroidal hydroxy compound, the solvent in which the oxidation is being performed, and the desired rate of oxidation. Generally speaking, lower temperatures will reduce the rate of oxidation whilst higher temperatures give rise to side reactions. In certain instances, especially when the starting steroid is an allylic alcohol, the oxidation proceeds satisfactorily at ambient temperature. More usually, however, it is desirable to operate at a temperature of between about 40° C. and about 150° C., and the preferred range is often from about 50° C. to about 100° C. Sometimes, as for example, when the solvent is benzene, it is convenient to operate at the reflux temperature of the solvent.

The reaction mixture is preferably agitated vigorously through the oxidation period.

The time needed to effect the oxidation depends primarily upon the nature of the organic hydroxy starting compound and also the temperature at which the process is conducted. In some instances, the oxidation is substantially complete within a period of between about 30 minutes and about 2 hours, but in other cases longer periods, say 10–20 hours, may be required. The course of the oxidation can be readily followed by thin-layer chromatography, with the disappearance of the spot due to the hydroxy compound indicating complete oxidation to the corresponding carbonyl compound. Preferably, the water formed during the oxidation is continuously eliminated, for otherwise the accumulation of water may deleteriously affect the reaction resulting in poor yields. When the process is conducted in benzene as the solvent, then by operating at the reflux temperature and in an apparatus such as the Dean-Stark apparatus, the water formed in the reaction may be continuously eliminated.

Alternatively, water may be removed from the condensate, prior to its return to the reaction, by passage over a molecular sieve (e.g. Soxhlet apparatus).

The process according to this invention is of particular value in that it provides a new and simple method of converting an organic hydroxy compound into the corresponding carbonyl compound. Whilst the process is of general application, the organic hydroxy compound is typically a primary or secondary steroidal alcohol which are converted by the process, often in virtually quantitative yields, to the corresponding aldehyde and ketone respectively. The primary or secondary alcohol grouping may be present in, for instance, an aliphatic, alicyclic, aromatic, heterocyclic, or carbohydrate compound and examples of alcohols which are oxidized successfully to the corresponding aldehyde and ketone using the process of this invention include, methanol, ethanol, propanol, butanol, hexanol, benzyl alcohol, catechol, hydroquinone, 1,4 - naphthaquinol, 2,6 - naphthaquinol, geraniol, nerol, phytol and farnesol.

The process of this invention is very well suited to, and accordingly is particularly valuable for, the oxidation of steroidal compounds containing one or more primary or secondary hydroxy groups. Many steroid compounds, for instance, sapogenins such as smilagenin and corticoids such as various pregnane compounds, are extremely sensitive and are very liable to undergo degradation or rearrangement on contact with acid or base. Thus, the spiroketal side chain in sapogenins is readily cleaved upon exposure to acid, and the side chain at the 17-position in steroids of the pregnane series is susceptible to attack by acid or base, and is very easily degraded. Now, the process of this invention, when, as is preferred, it is conducted in an organic solvent, is effected under neutral conditions. Sensitive steroidal compounds, therefore, are less likely to be adversely affected by the oxidation process than they would be were the oxidation to involve acidic or basic media. For example, employing the process of this invention, smilagenin is converted into the corresponding 3-keto compound without any appreciable cleavage of the spiroketal side chain, and a pregnane steroid, such as 16($\alpha$ or $\beta$)-methyl-5$\alpha$-pregnane-3$\beta$,17$\alpha$,21 - triol-20-one 21-acetate is oxidized at the 3-position without any degradation of the cortical side chain at the 17-position.

The process according to the invention is, therefore, a highly useful method for the oxidation of hydroxy groups located at various positions in a steroid molecule and is applicable to pregnanes, spirostanes, oestranes, androstanes, cholestanes, ergostanes, lanostanes and stigmastanes together with their various unsaturated derivatives, for example, pregnenes, pregnadienes, etc. and the corresponding homo and nor derivatives. Many naturally occurring steroids commonly used as the starting point for the synthesis of important therapeutically active steroids contain a 3-hydroxy-saturated-A-ring system, and their conversion into the final product often involves the oxidation of the hydroxy group at the 3-position to a keto group. Accordingly, the process of this invention affords a simple yet effective means of effecting this conversion, so that an especially valuable application of the process is to such 3-hydroxy-saturated-A-ring steroids.

By way of example, included in known procedures for the preparation of known therapeutically valuable compounds such as 16$\alpha$-methylprednisone, 16$\beta$-methylprednisone, 9$\alpha$-fluoro-16$\beta$-methylprednisolone 21-acetate, is a step involving the oxidation of a 3-hydroxy intermediate to the corresponding 3-keto compound, i.e. the oxidation of 3$\alpha$ - hydroxy - 16$\alpha$-methylpregnane-17$\alpha$,21-diol-11,20-dione 21-acetate, 3$\alpha$ - hydroxy - 16$\beta$ - methylpregnane-17$\alpha$,21 - diol - 11,20 - dione 21-acetate, 3$\alpha$-hydroxy-16$\beta$-methylpregnane - 11$\alpha$,17$\alpha$,21 - triol - 20-one 21 acetate and 3$\beta$ - hydroxy - 16$\alpha$ - methyl - 5$\alpha$-pregnane-17$\alpha$,21-diol-20-one 21-acetate, respectively to the corresponding 3-keto derivatives, which oxidations can now be advantageously carried out in good yield according to the process of this invention.

With certain steroidal alcohols containing two or more hydroxy groups, steric factors operate which make for differences in the reactivity of the hydroxy groups so endowing the process with a certain selectivity in that the more reactive hydroxy groups are preferentially oxidized. For instance, it has been found that in steroidal alcohols, hydroxy groups at the 3$\alpha$-, 3$\beta$- and 17$\beta$-positions are more readily oxidized than hydroxy groups at the 6$\alpha$-, 7$\alpha$- and 12$\alpha$-positions. This feature of the process is advantageous, for it provides for the possibility of selective oxidation. Thus, 4,4-dimethyl-5$\alpha$-androstane-6$\alpha$,17$\beta$-diol may, using the process of this invention, be converted in good yield into the corresponding 6$\alpha$-hydroxy-17-keto compound for the 17$\beta$-hydroxy group is more reactive than that at the 6$\alpha$-position. Again, methyl cholate which contains hydroxy groups at the 3$\alpha$-, and 7$\alpha$- and 12$\alpha$-positions may be selectively oxidized at the 3$\alpha$-position.

Aside from the observed preferential oxidation of hydroxy groups dependent upon their location in a particular steroidal alcohol, the reactivity of the hydroxy groups and, therefore, the speed of the reaction often appears to be dependent upon the structure of the compound. For example, in allylic alcohols, the double bond enhances the reactivity of the hydroxy group so that these alcohols are generally more readily oxidized than the corresponding saturated alcohols. Accordingly, steroid molecules containing both an allylic hydroxy group and a saturated hydroxy group can, using the process of this invention, be selectively oxidized. For instance, when 4-androstene-3$\beta$,17$\beta$-diol is used as the starting compound and the reaction is done at room temperature, the 3-hydroxy group is preferentially oxidized, and testosterone can be isolated in excellent yields.

Composition of matter aspect

According to the invention, in its composition of matter aspect, there is provided a composition of matter suitable for use as an oxidizing agent, which comprises silver carbonate and an inert carrier, preferably diatomaceous earth, on which the salt is dispersed. Other substances, for example, binders and lubricants, may be present in these compositions.

The composition according to this invention is an advantageous oxidizing agent because the silver carbonate is dispersed over, and combined with, a matrix provided by the inert carrier, preferably diatomaceous earth, so ensuring good contact between the silver carbonate and the organic hydroxy compound which it is desired to oxidize. Further, the composition is in a convenient form for use, for instance, it can be readily stored, it mixes readily with the organic hydroxy compound during the oxidation process, and can be easily recovered, say by filtration, from the aldehyde or ketone end product of the oxidation process.

The proportion of the silver carbonate required in these compositions can vary considerably depending upon such factors as, for example, the nature of the organic hydroxy compound which it is desired to oxidize. Generally, however, it is preferred that the silver carbonate be present in an amount such that when a given composition is utilized in the oxidation process, there are between 2 and 30, usually between 2 and 15, equivalents of silver carbonate per mole of the compound undergoing the oxidation.

Suitable inert carriers for the oxidizing agent composition include materials such, for example, as alumina, silica-alumina, siliceous earths, clays, kieselguhr, carbon black, and preferably diatomaceous earths. These carriers are generally characterized by having a large surface area which makes, in the oxidation process, for good contact between the salt dispersed thereon, and the organic hydroxy compound. A particularly convenient material for use as the carrier is diatomaceous earth which is commercially available under such trade names as Dicalite and Celite. Preferred is the diatomaceous earth known by the trade name Celite. Prior to incorporating this Celite in the composition it may be desirable to wash it, for instance, first with an acid and then with distilled water until the washings are neutral.

The amount of carrier, e.g. Celite, present in these compositions can vary considerably, and the optimal quantity is dependent upon variables such as the content of the carrier, the nature of the organic hydroxy compound and the amount thereof which is to be oxidized. However, for convenience of use in the process, especially removal of the oxidizing agent composition from the oxidized product, it is often desirable that the carrier content should not be much less than 1 gm. for lesser amounts can present recovery problems. In typical compositions provided by this invention the carrier, e.g. Celite, forms 30–70 percent by weight of the composition, and usually 40–60 percent, although the proportion of carrier, e.g. Celite, relative to silver carbonate may be higher or lower according to the circumstances.

The oxidizing agent compositions of matter according to this invention may be made in a number of different ways. For example, an appropriate quantity of the inert carrier may be added to a dispersion of the silver carbonate, and effective distribution of the latter over the carrier surface accomplished simply by stirring together. Alternatively, the oxidizing agent may be made by mixing the silver carbonate in powder form, conveniently in the presence of water, with the carrier and any other substances which are to be present. The resulting mixture may then, if desired, be formed into shaped pieces, for example, by compression or extrusion. In another, and preferred mode of making the compositions, the silver carbonate may be precipitated onto the inert carrier, preferably Celite, by reacting together in the presence of the inert carrier, e.g. Celite, a soluble silver salt, e.g. silver nitrate, and a salt, e.g. sodium carbonate or bicarbonate, which undergoes a double decomposition reaction with the silver salt, to form the desired insoluble silver carbonate.

A convenient method for producing the preferred composition of matter comprising silver carbonate and Celite, is outlined below:

A commercially available grade of Celite is washed with an alcohol containing some hydrochloric acid, then with water until there is no chloride reaction with silver nitrate. An appropriate quantity of this washed Celite is added to a solution of silver nitrate in water, and the mixture stirred until a slurry is formed. A solution of sodium carbonate in water is then added slowly, and with constant stirring to this slurry. The solid yellow phase so obtained is separated by filtration, and washed with water until neutral. It is then dried on a water bath under vacuum to give a fine yellowish-brown powder which is not affected by light, and which can be stored for some weeks without any significant diminution of activity, though best results are often obtained in the process when the composition is prepared immediately, or just shortly before use.

The method outlined in the foregoing can be varied considerably without essentially departing from the properties of he composition so obtained and, it will be appreciated, that the initial reactants can be mixed together in various amounts.

DESCRIPTION OF THE PREFERRED EMBODIMENTS

Composition of mater aspect

Preferred oxidizing agents of this invention are compositions of matter comprising silver carbonate on a diatomaceous earth wherein the diatomaceous earth comprises from about 40% to about 60% by weight of said compositions. For use in the foregoing compositions, the preferred diatomaceous earth is Celite.

Specifically, the oxidizing agent of this invention most advantageously employed in the preferred embodiment of the process aspect of our invention is a composition comprising silver carbonate on Celite which contains one millimole of silver carbonate per 0.57 gm. of said composition. These preferred compositions are made according to the procedure set forth hereinbelow in Example 1.

Process aspect

When carrying out the oxidation process of this invention, there is preferably utilized a quantity of oxidizing agent sufficient to supply from about 8 to about 15 molar equivalents of silver carbonate per mole of steroid to be oxidized. We find it most convenient to utilize the preferred oxidizing agent of this invention as defined hereinabove as our source of silver carbonate; thus a preferred mode of our process is that wherein for each millimole of steroid there is used about 4.57 gms. to about 8.55 gms. of an oxidizing composition comprising silver carbonate and Celite which contains one millimole of silver carbonate per 0.57 gram of said composition.

When the starting steroid contains a non-reactive hydroxyl function, e.g. such as in 16$\beta$-methylpregnane-3$\beta$, 17$\alpha$,21-triol-20-one 21-acetate, the solvent of choice is anhydrous benzene maintained at from about 50° C. to about 80° C., preferably at reflux temperature (around 80° C.).

When the starting steroid has an allylic (therefore more reactive) hydroxyl function, e.g. 4 - androstene-3$\beta$, 17$\beta$-diol, a solvent of choice is anhydrous methanol maintained at room temperature or at reflux temperatures for a short time, e.g. 10 minutes.

As set forth hereinabove, our process is particularly valuable when applied to the oxidation of 3-hydroxy-saturated-A-ring steroids, particularly of the pregnane series whereby are formed 3-keto-saturated-A-ring steroids. Thus, in particular, a preferred species of the process aspect of our invention is the process which comprises reacting a 3-hydroxy-A-ring-saturated pregnane in anhydrous benzene with an oxidizing agent comprising silver carbonate and Celite, said oxidizing agent containing from about 8 to about 15 molar equivalents of silver carbonate per mole of said 3-hydroxy-A-ring-saturated pregnane, whereby is formed a 3-keto-A-ring-saturated pregnane.

Most specifically, the preferred species of the process aspect of our invention is the foregoing process when there is utilized the preferred oxidizing agent of our invention, i.e. the process of reacting a 3-hydroxy-saturated-A-ring-pregnane in anhydrous benzene at reflux temperature with an oxidizing composition comprising silver carbonate and Celite which has one millimole of silver carbonate per 0.57 gm. of said composition, the amount of said composition being from about 4.57 grams to about 8.55 grams of oxidizing composition per mole of 3-hydroxy-saturated-A-ring-pregnane.

Another preferred species of the process aspect of our invention is that wherein the starting steroid contains an allylic hydroxyl at C-3 and less reactive hydroxyl groups at other positions of the steroid molecule such as is present in 4-androstene-3β,17β-diol, wherein, by utilizing anhydrous methanol at room temperature and by utilizing the preferred oxidizing composition of our invention, oxidation at C-3 is effected in almost quantitative yields without oxidation occurring at the less reactive groups, e.g. at C-17, elsewhere, thus providing a method for selective oxidation of steroidal hydroxy groups in good yields of pure product.

In order that the invention may be well understood the following examples are given by way of illustration only. The first two of these examples show the preparation of typical compositions of matter provided by this invention, whilst the remainder illustrate the use of the compositions of matter in the oxidation of various organic hydroxy compounds.

EXAMPLE 1

A quantity of a commercially available grade of Celite (No. 535) is washed with methanol containing 10 percent by volume of hydrochloric acid, filtered and then washed with distilled water until the washings show no chloride reaction when tested with silver nitrate.

30 gms. of this washed Celite are added to a stirred solution comprising 34 gms. of silver nitrate in 200 ml. distilled water. To the resulting slurry is then slowly added a stirred solution comprising 30 gms. of sodium carbonate (decahydrate) in 300 ml. water. A solid yellow phase is formed which, after about 10 minutes, is separated by filtration. It is then washed with distilled water until the washings are neutral, then dried on a water bath under vacuum. The composition so-obtained is in the form of a fine brownish-yellow powder which is not affected by light and which can be stored, without any appreciable diminution of activity, for some weeks. It contains 1 millimole of silver carbonate per 0.57 gm. of the composition.

EXAMPLE 2

30 gms. of "prepared" Celite washed in the same way as that employed in the procedure of Example 1 are added to a stirred solution comprising 32.5 gms. of mercuric nitrate dissolved in 500 ml. distilled water. To the resulting slurry, there is added a solution comprising 40 gms. of potassium bicarbonate dissolved in 200 ml. distilled water. The solution is stirred for 10 minutes after the addition, and during this time carbon dioxide is evolved. The solid material is recovered by filtration, then taken up twice in distilled water, and the suspension filtered on each occasion after which the material is washed until neutral. It is then dried on a water-bath under vacuum to yield 51.2 gms. of the composition in the form of a reddish-brown powder which is believed to contain mercuric carbonate.

EXAMPLE 3

Oxidation of hydroquinone to quinone 110 mgs. (1 millimole) of hydroquinone are added to a Dean-Stark apparatus containing 2.25 gms. (4 millimole) of the silver carbonate-containing composition of Example 1 as the oxidizing agent in 80 ml. benzene. This mixture is heated for 2 hours at the reflux temperature of benzene, and during this heating the water formed as a consequence of the oxidation is continuously eliminated from the system. The reaction mixture is then filtered to remove the oxidizing agent, and the benzene removed from the filtrate by evaporation to leave 94 mg. of quinone crystals (identified by the I.R. spectra which was superposable upon that of an authentic sample of quinone).

EXAMPLE 4

Oxidation of methyl 2-napthoquinol to methyl 2-napthoquinone

Following the procedure of Example 3, using 174 mg. (1 millimole) of methyl 2-napthoquinol and refluxing for 3 hours, there is obtained 170 mg. of the corresponding methyl 2-napthoquinone in the form of yellow crystals (M.P. 103–106° C.; lit. 104–106° C.).

EXAMPLE 5

Oxidation of abietic alcohol to abietaldehyde 411 mg. of abietic alcohol dissolved in 30 ml. anhydrous benzene are added to 10 g. of the silver carbonate-containing composition of Example 1 and the mixture refluxed for 3 hours at the end of which period the oxidation of the alcohol to the corresponding aldehyde, abietinol is complete (as evidenced by thin-layer chromatography). The aldehyde (abietaldehyde), which is obtained in almost quantitative yield, is recovered by filtration to remove the oxidizing agent and evaporation to remove the benzene solvent.

EXAMPLE 6

Oxidation of phytol to 3, 7, 11, 15-tetramethyl-2-hexadecene-1-al 5 g. phytol (3, 7, 11, 15-tetramethyl-2-hexadecene-1-ol) are added to a suspension containing 57 g. (10 millimoles) of the silver carbonate-containing composition of Example 1 in 500 cc. benzene. The mixture is refluxed for 1½ hr., and the water formed continuously eliminated. The reaction mixture is then filtered to remove the oxidizing agent and the aldehyde product recovered from the filtrate by evaporation of the benzene solvent. The aldehyde (3, 7, 11, 15-tetramethyl-2-hexadecene-1-al) of which 4 g. are obtained, is substantially pure as there is only one spot on the chromatogram.

EXAMPLE 7

Oxidation of lithocholic acid methyl ester to 3-ketolithocholic acid methyl ester 196 mg. of the methyl ester of lithocholic acid are added to 4.5 g. (8 millimoles) of the composition of Example 1 in 60 ml. of benzene. The mixture is refluxed for 22 hours, at the end of which period the oxidation is complete and the corresponding 3-keto-lithocholic acid methyl ester is recovered in an amount of 187 mg. (96 percent yield). It had a M.P. of 112–116° C. (lit. 116–120° C.).

EXAMPLE 8

3.6 g. (8.6 millimoles) of the methyl ester of cholic acid (3α, 7α, 12α-trihydroxycholanic acid methyl ester) are oxidized following the general procedure of the previous example using 48 g. of the silver carbonate-containing composition in 500 ml. of benzene and refluxing for 48 hours. At the end of this period, 3.4 g. of oxidized product are recovered by filtration and evaporation. It is then recrystallized from ethyl acetate to yield 2.4 g. of 3-keto-7α, 12α-dihydroxycholanic acid methyl ester (M.P. 175–176° C.; lit. 171–173° C.) showing that the hydroxy group at the 3-position is preferentially oxidized.

EXAMPLE 9

Oxidation of smilagenin to the 3-keto analog; 22E, 25D-spirostan-3-one 35 g. of the composition of Example 1 are heated in a Dean-Stark apparatus with 120 ml. of benzene until the residual water in the composition is eliminated. Thereafter, 1.250 g. (3 millimoles) of smilagenin are added, and the mixture refluxed for 1½ hour. At the end of this period, the starting compound, as evidenced by thin layer chromatography, has been entirely transformed into the corresponding 3-keto compound without cleavage of the spiroketal side chain. The reaction mixture is then filtered and the solids washed several times with benzene, and the washings added to the filtrate. The solvent is removed from the filtrate by evaporation and the solid residue dissolved in methylene chloride before filtering to remove any black solver particles. The solvent is then evaporated to leave 1.179 g. (94%) of the 3-keto compound, 22E, 25D-spirostan-3-one, M.P. 186–190° C. (lit. 186–189° C.) with one spot on a thin layer chromatogram. Recrystallization gives an analytically pure sample, M.P. 187–189° C.

EXAMPLE 10

Oxidation of 4-androstene-3β,17β-diol to testosterone 288 mg. (1 millimole) of 4-androstene-3β,17β,diol are added to 8.6 g. (15 millimoles silver carbonate) of the composition of Example 1 in 60 ml. anhydrous methanol. The mixture is refluxed for 10 minutes. The oxidizing agent is then filtered off, and the methanol removed by evaporation to yield 287 mg. of a brown product. This, on purification by chromatography using alumina and ethyl acetate as the eluant, gives 261 mg. (90% yield) of the corresponding 3-keto-17β-hydroxy compound, testosterone, M.P. 149–152° C. (lit. 151–154° C.).

EXAMPLE 11

Oxidation of 16β - methylpregnane-3β,17α,21-triol-20-one 21 - acetate to 16β - methylpregnane-17α,21-diol-3,20-dione 21-acetate 407 mg. of 16β-methylpregnane-3β,17α,21-triol-20-one 21-acetate are added to 8.8 g. of the composition of Example 1 in 50 ml. benzene. The mixture is refluxed for 6½ hours. It is then filtered, and the colourless benzene solvent removed from the filtrate to give 404 mg. of 16β - methylpregnane - 17α,21-diol-3,20-dione 21-acetate. This crude material is purified by recrystallization from methanol, M.P. 181–182° C. (no depression when mixed with an authentic sample).

EXAMPLE 12

Oxidation of 16α - methylpregnane-3β,17α,21-triol-20-one 21-acetate to 16α - methylpregnane - 17α,21 - diol - 3, 20-dione 21-acetate The procedure of Example 11 is followed using, as the starting compound, the 16α-methyl epimer to yield 16α-methylpregnane-17α,21-diol-3,20-dione 21-acetate.

EXAMPLE 13

In a manner similar to that described in Examples 9, 10–12, treat each of the following 3-hydroxy steroids with silver carbonate on Celite (i.e. the composition prepared as in Example 1) in benzene. Isolate the resultant respective products in a manner similar to that described in Examples 9–12 to obtain the following 3-keto steroidal products:

| Starting compound, 3-hydroxy Steroid | Product, 3-keto steroid |
| --- | --- |
| (1) 5α-pregnan-3β-ol-20-one | (1) 5α-pregnane-3,20-dione. |
| (2) 5β-pregnan-3α-ol-20-one | (2) 5β-pregnane-3,20-dione. |
| (3) 5α-pregnane-3β,17α-diol-20-one | (3) 5α-pregnan-17α-ol-3,20-dione. |
| (4) 5β-Pregnane-3α,17α-diol-20-one | (4) 5β-Pregnan-17α-ol-3,26-dione. |
| (5) 5α-pregnane-3β,17α,21-triol-20-one 21 acetate | (5) 5α-pregnane-17α,21-diol-3,20-dione 21-acetate. |
| (6) 5β-pregnane-3α,17α,21-triol-20-one 21-acetate | (6) 5β-pregnane-17α,21-diol-3,20-dione 21-acetate. |
| (7) 16α-methyl-5α-pregnan-3β-ol-20-one | (7) 16α-methyl-5α-pregnane-3,20-dione. |
| (8) 16α-methyl-5β-pregnane-3α-ol-20-one | (8) 16α-methyl-5β-pregnane-3,20-dione. |
| (9) 16α-methyl-5α-pregnane-3β,17α-diol-20-one | (9) 16α-methyl-5α-pregnan-17α-ol-3,20-dione. |
| (10) 16α-methyl-5β-pregnane-3α,17α-diol-20-one | (10) 16α methyl-5β-pregnan-17α-ol-3,20-dione. |
| (11) 16α-methyl-5α-pregnane-3β,17α,21-triol-20-one 21-acetate. | (11) 16α-methyl-5α-pregnane-17α,21-diol-3,20-dione 21-acetate. |
| (12) 16α-methyl-5β-pregnane-3α,17α,21-triol-20-one 21-acetate. | (12) 16α-methyl-5β-pregnane-17α,21-diol-3,20-dione 21-acetate. |
| (13) 16β-methyl-5α-pregnan-3β-ol-20-one. | (13) 16β-methyl-5α-pregnane-3,20-dione. |
| (14) 16β-methyl-5β-pregnan-3α-ol-one. | (14) 16βmethyl-5β-pregnane-3,20-dione. |
| (15) 16β-methyl-5α-pregnane-3β,17α-diol-20-one. | (15) 16β-methyl-5α-pregnan-17α-ol-3,20-dione. |
| (16) 16β-methyl-5β-pregnane-3α,17α-diol-20-one. | (16) 16β-methyl-5β-pregnan-17α-ol-3,20-dione. |
| (17) 16β-methyl-5α-pregnane-3β,17α,21-triol-20-one-21-acetate. | (17) 16β-methyl-5α-pregnane-17α,21-diol-3,20-dione 21-acetate. |
| (18) 16βmethyl-5β-pregnane-3α,17α,21-triol-20-one 21-acetate. | (18) 16βmethyl-5β-pregnane-17α,21-diol-3,20-dione 21-acetate. |
| (19) 5α-pregnane-3β-ol-11,20-dione. | (19) 5α-pregnane-3,11,20-trione. |
| (20) 5β-pregnane-3α-ol-11,20-dione. | (20) 5β-pregnane-3,11,20-trione. |
| (21) 5α-pregnane-3β,17α-diol-11,20-dione. | (21) 5α-pregnan-17α-ol-3,11,20-trione. |
| (22) 5β-pregnane-3α,17α-diol-11,20-dione. | (22) 5β-pregnan-17α-ol-3,11,20-trione. |
| (23) 5α-pregnane-3β,17α,21-triol-11,20-dione 21-acetate. | (23) 5α-pregnane-17α,21-diol-3,11,20-trione 21-acetate. |
| (24) 5β-pregnane-3α,17α,21-triol-11,20-dione 21-acetate. | (24) 5β-pregnane-17α,21-diol-3,11,20-trione 21-acetate. |
| (25) 16α-methyl-5α-pregnan-3β-ol-11,20-dione. | (25) 16α-methyl-5α-pregnane-3,11,20-trione. |
| (26) 16α-methyl-5β-pregnan-3α-ol-11,20-dione. | (26) 16α-methyl-5β-pregnane-3,11,20-trione. |
| (27) 16α-methyl-5α-pregnane-3β,17α-diol-11,20-dione. | (27) 16α-methyl-5α-pregnan-17α-ol-3,11,20-trione. |
| (28) 16α-methyl-5β-pregnane-3α,17α-diol-11,20-dione. | (28) 16α-methyl-5β-pregnan-17α-ol-3,11,20-trione. |
| (29) 16α-methyl-5α-pregnane-3β,17α,21-triol-11,20-dione 21-acetate. | (29) 16α-methyl-5α-pregnane-17α,21-diol-3,11,20-trione 21-acetate. |
| (30) 16α-methyl-5β-pregnane-3α,17α,21-triol-11,20-dione 21-acetate. | (30) 16α-methyl-5β-pregnane-17α,21-diol-3,11,20-trione 21-acetate |
| (31) 16β-methyl-5α-pregnan-3β-ol-11,20-dione. | (31) 16β-methyl-5α-pregnane-3,11,20-trione. |
| (32) 16β-methyl-5β-pregnan-3α-ol-11,20-dione. | (32) 16β-methyl-5β-pregnane-3,11,20-trione. |
| (33) 16β-methyl-5α-pregnane-3β,17α-diol-11,20-dione. | (33) 16β-methyl-5α-pregnan-17α-ol-3,11,20-trione. |
| (34) 16β-methyl-5β-pregnane-3α,17α-diol-11,20-dione. | (34) 16β-methyl-5βpregnan-17α-ol-3,11,20-trione. |
| (35) 16β-methyl-5α-pregnane-3β,17α,21-triol-11,20-dione 21-acetate. | (35) 16β-methyl-5α-pregnane-17α,21-diol-3,11,20-trione 21-acetate. |
| (36) 16β-methyl-5β-pregnane-3α,17α,21-triol-11,20-dione 21 acetate. | (36) 16β-methyl-5β-pregnane-17α,21-diol-3,11,20-trione 21-acetate. |
| (37) 5α-9(11)-pregnen-3β-ol-20-one. | (37) 5α-9(11)-pregnene-3,20-dione. |
| (38) 5β-9(11)-pregnen-3α-ol-20-one. | (38) 5β-9(11)-pregnene-3,20-dione |
| (39) 5α-9(11)-pregnene-3β,17α-diol-20-one. | (39) 5α-9(11)-pregnen-17α-ol-3,20-dione. |
| (40) 5β-9(11)-pregnene-3α,17α-diol-20-one. | (40) 5β-9(11)-pregnen-17α-ol-3,20-dione. |
| (41) 5α-9(11)-pregnene-3β,17α,21-triol-20-one 21-acetate. | (41) 5α-9(11)-pregnene-17α,21-diol-3,20-dione 21-acetate. |
| (42) 5β-9(11)-pregnene-3α,17α,21-troil-20-one 21-acetate. | (42) 5β-9(11)-pregnene-17α,21-diol-3,20-dione 21-acetate. |
| (43) 16α-methyl-5α-9(11)-pregnen-3β-ol-20-one. | (43) 16α-methyl-5α-9(11)-pregnene-pregnene-3,20-dione. |
| (44) 16α-methyl-5β-9(11)-pregnen-3α-ol-20-one. | (44) 16α-methyl-5β-9(11)-pregnene-3,20-dione. |
| (45) 16α-methyl-5α-9(11)-pregnene-3β,17α-diol-20-one. | (45) 16α-methyl-5α-9(11)-pregnene-17α-ol-3,20-dione. |
| (46) 16α-methyl-5β-9(11)-pregnene-3α,17α-diol-20-one. | (46) 16α-methyl-5β-9(11)-pregnen-17α-ol-3,20-dione. |
| (47) 16α-methyl-5α-9(11)-pregnene-3β,17α,21-triol-20-one 21-acetate. | (47) 16α-methyl-5α-9(11)-pregnene-17α,21-diol-3,20-dione 21-acetate. |
| (48) 16α-methyl-5β-9(11)-pregnene-3α,17α,21-triol-20-one 21-acetate. | (48) 16α-methyl-5α-9(11)-pregnene 17α,21-diol-3,20-dione 21-acetate. |
| (49) 16β-methyl-5α-9(11)-pregnen-3β-ol-20-one. | (49) 16β-methyl-5α-9(11)-pregnene-3,20-dione. |
| (50) 16β-methyl-5β-9(11)-pregnen-3α-ol-20-one. | (50) 16β-methyl-5β-9(11)-pregnene-3,20-dione. |
| (51) 17β-methyl-5α-9(11)-pregnene-3β,18α-diol-20-one. | (51) 16β-methyl-5α-9(11)-pregnen-17α-ol-3,20-dione. |
| (52) 16β-methyl-5β-9(11)-pregnene-3α,17α-diol-20-one. | (52) 16β-methyl-5β-9(11)-pregnen-17α-ol-3,20-dione. |
| (53) 16β-methyl-5α-9(11)-pregnene-3β,17α,21-triol-20-one 21-acetate. | (53) 16β-methyl-5α-9(11)-pregnene-17α-21-diol-3,20-dione 21-acetate. |
| (54) 16β-methyl-5β-9(11)-pregnene-3α,17α,21-triol-20-one 21-acetate. | (54) 16β-methyl-5β-9(11)-pregnene-17α,21-diol-3,20-dione 21-acetate. |
| (55) 6α-methyl-5α-pregnan-3β-ol-20-one. | (55) 6α-methyl-5α-pregnane-3,20-3,20-dione. |
| (56) 6α-methyl-5β-pregnan-3α-ol-20-one. | (56) 6α-methyl-5β-pregnane-3,20-dione. |
| (57) 6α-methyl-5α-pregnane-3β,17α-diol-20-one. | (57) 6α-methyl-5α-pregnan-17α-ol-3,20-dione. |
| (58) 6α-methyl-5β-pregnane-3α,17α-diol-20-one. | (58) 6α-methyl-5β-pregnan-17α-ol-3,20-dione. |
| (59) 6α-methyl-5α-pregnane-3β,17α,21-triol-20-one 21-acetate. | (59) 6α-methyl-5α-pregnan-17α,21-diol-3,20-dione 21-acetate. |
| (60) 6α-methyl-5β-pregnane-3α,17α,21-triol-20-one 21-acetate. | (60) 6α-methyl-5β-pregnane-17α,21-diol-3,20-dione 21-acetate. |
| (61) 6β-methyl-5α-pregnan-3β-ol-20-one. | (61) 6β-methyl-5α-pregnane-3,20-dione. |
| (62) 6β-methyl-5β-pregnan-3α-ol-20-one. | (62) 6β-methyl-5β-pregnane-3,20-dione. |
| (63) 6β-methyl-5α-pregnane-3β,17α-diol-20-one. | (63) 6β-methyl-5α-pregnan-17α-ol-3,20-dione. |
| (64) 6β-methyl-5β-pregnane-3α,17α-diol-20-one. | (64) 6β-methyl-5β-pregnan-17α-ol-3,20-dione. |
| (65) 6β-methyl-5α-pregnane-3β,17α,21-triol-20-one 21-acetate. | (65) 6β-methyl-5α-pregnane-17α,21-diol-3,20-dione 21-acetate. |
| (66) 6β-methyl-5β-pregnane-3α,17α,21-troil-20-one 21-acetate. | (66) 6β-methyl-5β-pregnane-17α,21-diol-3,20-dione 21-acetate. |

| Starting compound, 3-hydroxy Steroid | Product, 3-keto steroid (1) |
|---|---|
| (67) 5α-androstan-3β-ol-17-one | (67) 5α-androstane-3,17-dione. |
| (68) 5β-androstan-3α-ol-17-one | (68) 5β-androstane-3,17-dione. |
| (69) 5α-Androstan-3α-ol-17-one | (69) 5β-androstane-3,17-dione. |
| (70) 17α-methyl-5α-androstane-3β,17β-diol. | (70) 17α-methyl-5α-androstan-17β-ol-3-one. |
| (71) 17α-ethinyl-5α-androstane-3β,17β-diol. | (71) 17α-ethinyl-5α-androstan-17β-ol-3-one. |
| (72) Desoxycholic acid ethyl ester | (72) 3-keto-12α-hydroxycholanic acid ethyl ester. |
| (73) 5α-cholestan-3β-ol | (73) 5α-cholestan-3-one. |
| (74) 5β-cholestan-3β-ol | (74) 5β-cholestan-3-one. |
| (75) 3β,19-dihydroxy-5α-cholestan | (75) 19-hydroxy-5α-cholestan-3-one. |
| (76) 5α-stigmastan-3β-ol | (76) 5α-stigmastan-3-one. |
| (77) Solanidanol | (77) Solanidanone. |
| (78) Diosgenin | (78) 5-22ε,25D-spirosten-3-one. |
| (79) Yamogenin | (79) 5-22ε,25L-spirosten-3-one. |
| (80) 11-keto-ticogenin | (80) 5α,22ε,25D-spirostane-3,11-dione. |
| (81) Ticogenin | (81) 5α,22ε,25D-spirostan-3-one. |
| (82) Neoticogenin | (82) 5α,22ε,25L-spirostan-3-one. |
| (83) Sarasapogenin | (83) 22ε,25L-spirostan-3-one. |
| (84) Hecogenin | (84) 5α,22ε,25D-spirostane-3,12-dione. |
| (85) Neohecogenin | (85) 5α,22ε,25L-spirostane-3,12-dione. |
| (86) Botogenin | (86) 5-22ε,25D-spirostene-3,12-dione. |
| (87) Neobotogenin | (87) 5-22ε,25L-spirostene-3,12-dione. |
| (88) Digitoxigenin | (88) 17β-(2-butenolid)-5β-androstan 14β-ol-3-one. |
| (89) Tomatidine | (89) 3-keto analog. |

EXAMPLE 14

In a manner similar to that described in Examples 9, 10–12, each of the following steroidal alcohols were reacted in refluxing benzene with the composition comprising silver carbonate and Celite prepared as described in Example 1, and there were obtained the following non-carboxy carbonyl steroidal derivatives, respectively.

| Starting steroidal alcohol | Oxidized steroid | Moles silver carbonate | Reaction time, hrs. | Percent yield |
|---|---|---|---|---|
| Androstan-17β-ol | Androstan-17-one | 7.5 | 2.5 | 98.5 |
| 5-Androsten-17β-ol | 5-androsten-17-one | 7.5 | 2.5 | 95 |
| Androstan-3β-ol | Androstan-3-one | 8 | 5 | 87 |
| 4,4-dimethylandrostane-6α,17β-diol | 4,4-dimethylandrostan-6α-ol-17-one | 8 | 2 | 87.5 |
| Methyl cholate | Methyl 3-keto-7α,12α-dihydroxy cholanate. | 30 | 5 | 91 |
| Cholan-25-ol | Cholan-25-al | 20 | 33 | 91.5 |

We claim:

1. The process which comprises reacting a steroidal alcohol having a hydroxyl function selected from the group consisting of a primary and a secondary hydroxyl with an oxidizing agent comprising silver carbonate and diatomaceous earth in an essentially anhydrous inert organic liquid medium whereby is obtained a steroid having a non-carboxy carbonyl function.

2. The process of claim 1 wherein said diatomaceous earth is Celite.

3. The process of claim 1 wherein said inert organic liquid medium is an aromatic hydrocarbon.

4. The process of claim 3 wherein said aromatic hydrocarbon is benzene.

5. The process of claim 1 wherein said diatomaceous earth is Celite and said inert organic liquid medium is benzene.

6. The process of claim 1 wherein said inert organic liquid medium is an aliphatic alcohol.

7. The process of claim 1 wherein said diatomaceous earth is Celite and said inert organic liquid medium is methanol.

8. The process of claim 1 wherein said diatomaceous earth is Celite, said inert organic liquid medium is benzene, and wherein said oxidizing agent provides from about 2 to about 15 molar equivalents of silver carbonate per mole of steroidal alcohol.

9. The process of claim 1 wherein said diatomaceous earth is Celite, said inert organic liquid medium is benzene, and wherein said oxidizing agent comprises one millimole of silver carbonate per 0.57 gram of said oxidizing agent, there being sufficient oxidizing agent to provide from about 2 to about 15 molar equivalents of silver carbonate per mole of steroidal alcohol.

10. The process of claim 1 wherein said steroidal alcohol is a member selected from the group consisting of a 3-hydroxy steroid and a 17β-hydroxy steroid and wherein said diatomaceous earth is Celite.

11. The process of claim 1 wherein said steroidal alcohol is a 3-hydroxy steroid, said diatomaceous earth is Celite, and wherein said oxidizing agent provides from about 2 to about 15 molar equivalents of silver carbonate per mole of said 3-hydroxy steroid, and whereby said steroid obtained is a 3-keto steroid.

12. The process of claim 1 wherein said steroidal alcohol is a 3-hydroxy-saturated-A-ring steroid of the pregnane series, said diatomaceous earth is Celite, said non-reactive liquid medium is benzene at reflux temperature, and wherein said oxidizing agent provides about 8 molar equivalents of silver carbonate per mole of said 3-hydroxy-saturated-A-ring steroid and whereby there is obtained a 3-keto-saturated-A-ring steroid of the pregnane series.

13. The process of claim 12 wherein said oxidizing agent comprises one millimole silver carbonate per 0.57 gram of oxidizing agent, there being sufficient oxidizing agent to provide about 8 molar equivalents of silver carbonate per mole of said 3-hydroxy-saturated-A-ring-steroid of the pregnane series.

14. The process of claim 1 wherein said steroidal alcohol is a 3-hydroxy-saturated-A-ring-steroid of the pregnane series, said diatomaceous earth is Celite, said non-reactive liquid medium is benzene at reflux temperature, and wherein for each millimole of said 3-hydroxy-saturated-A-ring steroid of the pregnane series there is used from about 4.57 grams to about 8.55 grams of oxidizing agent comprising one millimole of silver carbonate per 0.57 gram of said oxidizing agent whereby is obtained a 3-keto-saturated-A-ring steroid of the pregnane series.

15. The process of claim 1 wherein said steroidal alcohol is an allylic 3-hydroxy-steroid, said diatomaceous earth is Celite, said non-reactive liquid medium is methanol, said oxidizing agent provides from about 2 to about 15 molar equivalents of silver carbonate per mole of said allylic 3-hydroxy-steroid, whereby is obtained an allylic 3-keto-steroid.

16. The process of claim 15 wherein for each mole of said allylic 3-hydroxy-steroid there is sufficient oxidizing agent to provide about 15 moles of silver carbonate.

17. A process according to claim 1 wherein said steroidal alcohol is a member selected from the group consisting of a 3-hydroxy steroid and a 17β-hydroxy steroid.

18. A process according to claim 1 wherein said steroidal alcohol is a 3-hydroxy-saturated-A-ring steroid of the pregnane series.

No references cited.

ELBERT L. ROBERTS, Primary Examiner

U.S. Cl. X.R.

260—239.57, 397.1, 397.2, 397.3, 397.4, 397.45, 397.47

PO-1050
(5/69)

UNITED STATES PATENT OFFICE
CERTIFICATE OF CORRECTION

Patent No. 3,531,475          Dated    September 29, 1970

Inventor(s) M. Fetizon and M. Golfier

It is certified that error appears in the above-identified patent and that said Letters Patent are hereby corrected as shown below:

Column 1, lines 5 - 7, "assignors to Société ... Levallois, France" should read --- assignors, by mesne assignments, to Schering Corporation, Bloomfield, N.J., a corporation of New Jersey ---.

Column 1, line 55, "hydroxy" should read --- hydroxyl ---.
Column 1, line 67, "saturated-A-steroidal" should read --- saturated-A-ring-steroidal ---. Column 3, line 6, "through the oxidation" should read --- throughout the oxidation ---. Column 4, line 20, "20-one 21 acetate" should read --- 20-one 21-acetate ---. Column 6, line 15, "mater aspect" should read --- matter aspect ---. Column 8, lines 3 and 6, "2-napthoquinol" should read --- 2-naphthoquinol ---. Column 8, lines 4 and 7, "2-napthoquinone" should read --- 2-naphthoquinone ---. Column 9, line 5, "solver" should read --- silver ---. Column 9, line 75, second row, "ol-3,26-dione" should read --- ol-3,20-dione ---. Column 9, line 72, first row, "5β-pregnane" should read ... 5β-pregnan ---. Column 9, line 74, second row "16α methyl" should read --- 16α-methyl ---. Column 10, line 7, first row, "3α-ol-one" should read --- 3α-ol-20-one ---. Column 10, line 38, second row, "ol-3,20-20-dione" should read --- ol-3,20-dione ---. Column 10, line 45, first row, "21-troil-20-one" should read --- 21-triol-20-one ---. Column 10, line 43, second row "pregnene-pregnene-3,20-dione" should read --- pregnene-3,20-dione ---. Column 10, line 50, second row 16α-methyl-5α" should read --- 16α-methyl-5β ---. Column 10, line 53, first row, "17β-methyl-5α-9(11)-pregnene-3β,18α-diol-20-one" should read --- 16β-methyl-5α-9(11)-pregnene-3β,17α-diol-20-one --- . Column 10, line 75, first row "21-troil-20" should read --- 21-triol-20 ---. Column 11, line 3, second row, "5β-androstane" should read --- 5α-androstane ---.

Signed and sealed this 29th day of December 1970

(SEAL)
Attest:

EDWARD M. FLETCHER, JR.          WILLIAM E. SCHUYLER, JR.
Attesting Officer                     Commissioner of Patents